US008951338B2

(12) United States Patent
Matsuda et al.

(10) Patent No.: US 8,951,338 B2
(45) Date of Patent: Feb. 10, 2015

(54) AIR FILTER MATERIAL USING LAMINATED ELECTRET NONWOVEN FABRIC

(75) Inventors: Yasushi Matsuda, Shiga (JP); Junji Iwata, Shiga (JP); Mitsuru Kojima, Shiga (JP)

(73) Assignees: JNC Corporation, Tokyo (JP); JNC Fibers Corporation, Tokyo (JP)

( * ) Notice: Subject to any disclaimer, the term of this patent is extended or adjusted under 35 U.S.C. 154(b) by 460 days.

(21) Appl. No.: 13/382,266

(22) PCT Filed: Jun. 21, 2010

(86) PCT No.: PCT/JP2010/060482
§ 371 (c)(1),
(2), (4) Date: Jan. 4, 2012

(87) PCT Pub. No.: WO2011/004696
PCT Pub. Date: Jan. 13, 2011

(65) Prior Publication Data
US 2012/0097037 A1  Apr. 26, 2012

(30) Foreign Application Priority Data
Jul. 8, 2009  (JP) ................................. 2009-161762

(51) Int. Cl.
B03C 3/34 (2006.01)
B03C 3/30 (2006.01)
B01D 39/16 (2006.01)
B32B 5/26 (2006.01)
D04H 1/559 (2012.01)
D04H 3/02 (2006.01)
B32B 5/02 (2006.01)
B32B 5/08 (2006.01)

(52) U.S. Cl.
CPC .............. B03C 3/30 (2013.01); B01D 39/1623 (2013.01); B32B 5/26 (2013.01); D04H 1/559 (2013.01); D04H 3/02 (2013.01); B32B 5/022 (2013.01); B32B 5/08 (2013.01); B01D 2239/0435 (2013.01); B01D 2239/0622 (2013.01); B01D 2239/0627 (2013.01); B01D 2239/064 (2013.01); B01D 2239/065 (2013.01); B01D 2239/1233 (2013.01); B32B 2262/0253 (2013.01); B32B 2307/204 (2013.01); B32B 2307/712 (2013.01); Y10S 55/39 (2013.01)
USPC ............... 96/69; 55/486; 55/528; 55/DIG. 39

(58) Field of Classification Search
CPC ................... B01D 39/1623; B01D 2239/0622; B01D 2239/0627; B01D 2239/064; B01D 2239/065; B01D 2239/1233; B03C 3/30; B32B 5/26; B32B 5/022; B32B 5/08; B32B 2307/712; B32B 2262/0253; B32B 2307/204; D04H 1/559; D04H 3/02
USPC .............. 96/75; 422/224, 225, 327, 330, 333, 422/334–416
See application file for complete search history.

(56) References Cited

U.S. PATENT DOCUMENTS

| 4,917,942 | A  | * | 4/1990 | Winters ............................ 96/99 |
| 5,616,408 | A  | * | 4/1997 | Oleszczuk et al. ............ 442/346 |
| 5,620,785 | A  | * | 4/1997 | Watt et al. ..................... 428/219 |
| 5,645,057 | A  | * | 7/1997 | Watt et al. ................ 128/206.12 |
| 5,709,735 | A  | * | 1/1998 | Midkiff et al. ..................... 96/17 |
| 5,766,737 | A  | * | 6/1998 | Willey et al. .................. 428/198 |
| 5,804,512 | A  | * | 9/1998 | Lickfield et al. .............. 442/346 |
| 5,817,584 | A  | * | 10/1998 | Singer et al. .................. 442/345 |
| 6,613,704 | B1 | * | 9/2003 | Arnold et al. .................. 442/361 |
| 7,063,733 | B2 | * | 6/2006 | Mori et al. ....................... 96/135 |
| 7,845,351 | B2 | * | 12/2010 | Mathis et al. ............ 128/206.21 |
| 2003/0045192 | A1 | * | 3/2003 | Midkiff et al. ................ 442/103 |
| 2004/0000313 | A1 | * | 1/2004 | Gaynor et al. ............ 128/205.27 |
| 2004/0002273 | A1 | * | 1/2004 | Fitting et al. ................... 442/351 |
| 2004/0225041 | A1 | * | 11/2004 | Kataoka et al. ............... 524/116 |
| 2005/0079379 | A1 | * | 4/2005 | Wadsworth et al. .......... 428/684 |
| 2007/0044801 | A1 | * | 3/2007 | Mathis et al. ............ 128/206.19 |
| 2008/0287026 | A1 | * | 11/2008 | Chakravarty et al. ......... 442/414 |
| 2010/0024136 | A1 | * | 2/2010 | Takenoiri et al. ................. 8/147 |
| 2010/0307503 | A1 | * | 12/2010 | Iwamoto et al. ......... 128/205.29 |

FOREIGN PATENT DOCUMENTS

| JP | 5-287682 | 11/1993 |
| JP | 2001-248056 | 9/2001 |
| JP | 2001 1248056 | * 9/2001 |
| JP | 2003-260321 | 9/2003 |
| JP | 2004-339677 | 12/2004 |
| JP | 2008-000696 | 1/2008 |

OTHER PUBLICATIONS

Database WPI, Week 200837, Thomson Scientific, London, GB; AN 2008-F66179, XP-002695365,1 page.

* cited by examiner

Primary Examiner — Duane Smith
Assistant Examiner — Sonji Turner
(74) Attorney, Agent, or Firm — Hamre, Schumann, Mueller & Larson, P.C.

(57) ABSTRACT

Present invention provides an air filter material using a laminated electret nonwoven fabric subjected to electret processing in which one layer or a plurality of layers of nonwoven fabrics (referred to as nonwoven fabric B) including fibers having a mean fiber diameter in the range of 10 micrometers to 100 micrometers and being larger than a mean fiber diameter of fibers constituting nonwoven fabric A are laminated on at least one side of a nonwoven fabric (referred to as nonwoven fabric A) obtained by mixing two kinds of fibers having a mean fiber diameter in the range of 0.1 micrometer to 15 micrometers and having a different melting point (fibers having a lower melting point are defined as fibers D and fibers having a higher melting point are defined as fibers E), and a laminated electret filter material having a low pressure loss and a high collection efficiency. The filter material is suitably used for a medical mask, an industrial mask, a general purpose mask or the like.

9 Claims, No Drawings

AIR FILTER MATERIAL USING LAMINATED ELECTRET NONWOVEN FABRIC

TECHNICAL FIELD

The present invention relates to an air filter material using a laminated electret nonwoven fabric. More particularly, the invention relates to an air filter material using a high performance laminated electret nonwoven fabric. The air filter material has a low pressure loss, a high dust collection efficiency and durability for long term use, and is suitable for use in a mask material and so forth.

BACKGROUND ART

Traditionally, a sheet made of a nonwoven fabric has been used in many cases as an air filter material for removing fine dust such as pollen or coarse particulates. Such an air filter material is required to have performance for collecting dust with a high efficiency, and a low pressure loss by which inhalation resistance is low when a gas passes through the air filter material. The air filter material allows collection of the fine dust such as the pollen and the coarse particulates by an electrostatic attraction and so forth in addition to a physical collection action by using a compacted matrix formed of fibers having a small fiber diameter or a filter subjected to electret processing.

A melt-blown nonwoven fabric including a mean fiber diameter of 15 micrometers or less frequently is used for the air filter material in order to form the compacted matrix. As a shape to be used, a product processed into a cup shape or a pleated form is used.

On the other hand, the melt-blown nonwoven fabric includes thin fibers and is subsequently flexible. Therefore, a packing material or a reinforcement has been needed when the melt-blown nonwoven fabric is used as the air filter material. Patent document No. 1 has proposed an air filter including biodegradable fibers in which a melt-blown nonwoven fabric and a spunbond nonwoven fabric are laminated. The filter material has a disadvantage of an increased pressure loss because a layer of the melt-blown nonwoven fabric and a layer of the spunbond nonwoven fabric are bonded by a number of partially fused parts by using an embossing roll.

Patent document No. 2 has proposed a laminated filter including a plurality of synthetic fibrous sheets having a different melting start temperature. A material of the laminated filter has a disadvantage of a low collection efficiency because the material is a combination of a melt-blown nonwoven fabric subjected to electret processing and a spunbond nonwoven fabric, and is not subjected to electret processing on a side of the spunbond nonwoven fabric.

PRIOR ART DOCUMENT

Patent Document

Patent Document No. 1: JP 2003-260321 A.
Patent Document No. 2: JP H5-287682 A.

SUMMARY OF INVENTION

Problem to be Solved by the Invention

An aim of the invention is to provide a laminated electret filter material having a low pressure loss and a high dust collection efficiency.

Means for Solving Problem

The inventors of the invention have diligently continued to conduct research for solving the problem in the background art, and as a result, have found that an air filter material having a low pressure loss and an excellent dust collection efficiency can be provided by using a laminated electret nonwoven fabric subjected to electret processing in structure in which one layer or a plurality of layers of nonwoven fabric B including a mean fiber diameter in the range of 10 micrometers to 100 micrometers are laminated on at least one side of nonwoven fabric A including a mean fiber diameter in the range of 0.1 micrometer to 15 micrometers, and thus have completed the invention based on the knowledge.

The invention includes the following items.

[1] An air filter material, wherein a laminated electret nonwoven fabric subjected to electret processing is used for a laminated nonwoven fabric in which two kinds of fibers having a mean fiber diameter in the range of 0.1 micrometer to 15 micrometers and having a different melting point are present, the fibers having a lower melting point are defined as fibers D, the fibers having a higher melting point are defined as fibers E, and a nonwoven fabric obtained by mixing fibers D and fibers E is defined as nonwoven fabric A, one layer or a plurality of layers of nonwoven fabric B including fibers having a mean fiber diameter in the range of 10 micrometers to 100 micrometers and being larger than a mean fiber diameter of fibers constituting nonwoven fabric A is laminated on at least one side of the nonwoven fabric A.

[2] The air filter material according to the item [1], wherein fibers D constituting nonwoven fabric A contain an elastomer, and a difference (e minus d) is in the range of 20 to 150° C. when a melting point of fibers D is defined as d (° C.) and a melting point of fibers E is defined as e (° C.).

[3] The air filter material using the laminated electret nonwoven fabric according to the item [1] or [2], wherein a difference (b minus d) is 20° C. or more when the melting point of fibers D constituting nonwoven fabric A is defined as d (° C.), a melting point of an ingredient having a lowest melting point among ingredients constituting at least a part of a surface of fibers constituting nonwoven fabric B is defined as b (° C.).

[4] The air filter material using the laminated electret nonwoven fabric according to any one of the items [1] to [3], wherein a weight ratio of fibers D to fibers E both constituting nonwoven fabric A, "weight of fibers D/weight of fibers E," is in the range of 20/80 to 80/20.

[5] The air filter material using the laminated electret nonwoven fabric according to any one of the items [1] to [4], wherein fibers D comprise a polyolefin elastomer.

[6] The air filter material using the laminated electret nonwoven fabric according to any one of the items [1] to [5], wherein a hindered amine compound is added to a resin ingredient constituting fibers D and fibers E.

[7] The air filter material using the laminated electret nonwoven fabric according to any one of the items [1] to [6], wherein nonwoven fabric A is a melt-blown nonwoven fabric and at least one layer of nonwoven fabric B to be laminated on nonwoven fabric A is a spunbond nonwoven fabric.

[8] The air filter material using the laminated electret nonwoven fabric according to any one of the items [1] to [7], wherein the air filter material is an air filter material in which at least one layer of nonwoven fabric B is laminated on both sides of nonwoven fabric A, respectively, nonwoven fabric A is a melt-blown nonwoven fabric, and at least one layer of nonwoven fabric B laminated on each side of nonwoven fabric A among nonwoven fabric B laminated on both sides of nonwoven fabric A is a spunbond nonwoven fabric.

[9] The air filter material using the laminated electret nonwoven fabric according to the item [7] or [8], wherein fibers constituting the spunbond nonwoven fabric of nonwoven fabric B comprise polyester.

[10] The air filter material using the laminated electret nonwoven fabric according to any one of the items [7] to [9], wherein at least one of nonwoven fabric B including the spunbond nonwoven fabric includes composite fibers having sheath-core structure for fibers constituting the spunbond nonwoven fabric, and a core ingredient comprises polyester, and a sheath ingredient comprises a resin having a melting point lower than a melting point of the core ingredient.

Effect of the Invention

The invention allows to provide a laminated electret air filter material having a low pressure loss and a high dust collection efficiency. In particular, the invention makes it possible to provide an electret filer material suitable for use in a mask.

DESCRIPTION OF EMBODIMENTS

Hereafter, the invention will be explained in detail.

A laminated electret nonwoven fabric of the invention is applied as an air filter material using a laminated electret nonwoven fabric provided by laminating at least one layer of nonwoven fabric B including a mean fiber diameter in the range of 10 micrometers to 100 micrometers on at least one side of nonwoven fabric A including a mean fiber diameter in the range of 0.1 to 15 micrometers, and applying electret processing to the laminated nonwoven fabric obtained. Fibers constituting nonwoven fabric A include mixed fibers containing fibers D, and fibers E having a melting point higher than a melting point of fibers D. "Mixed fibers" in the invention refers to a state in which at least two kinds of fibers are mixed uniformly to constitute a nonwoven fabric.

As for the fibers constituting nonwoven fabric A of the invention, the manufacturing method thereof is not limited as long as fibers D, and fibers E having the melting point higher than the melting point of fibers D are mixed in a state having a mean fiber diameter in the range of 0.1 micrometer to 15 micrometers. Moreover, according to the invention, the manufacturing method shall not preclude mixing fibers other than fibers D and fibers E in nonwoven fabric A within the range in which advantageous effects of the invention are not adversely affected.

Fibers D having a lower melting point relative to fibers E constituting nonwoven fabric A of the invention are preferably fibers including an elastomer in order to obtain bonding properties upon lamination.

When a melting point of fibers D is defined as d (° C.) and a melting point of fibers E is defined as e (° C.), a difference (e minus d) is preferably in the range of 20 to 150° C., further preferably, in the range of 30 to 120° C. When the difference (e minus d) is 20° C. or more, nonwoven fabric A and nonwoven fabric B can be united without melting fibers E having a high melting point when nonwoven fabric B is laminated with nonwoven fabric A. Thus, fibers E keep a fibrous form and thus a sufficient permeability can be maintained. Moreover, fibers D and fibers E are preferably spun through an identical spinneret for uniformly mixing fibers. However, if a melting point is extremely different between fibers D and fibers E in the case, ensuring spinnability tends to be difficult. A sufficient spinnability is ensured if the difference (e minus d) is 150° C. or less.

Nonwoven fabric A of the invention preferably is obtained according to a melt-blowing method. Nonwoven fabric A is preferably obtained by independently melting and extruding two kinds of thermoplastic resins having a difference in melting point in the range of 20° C. to 150° C., respectively, spinning fibers through a spinneret for melt-blowing of mixed fibers, further allowing the fibers to be subjected to blown spinning with a gas having a high temperature and a high speed in a flow of ultrathin fibers, and collecting a product as a mixed-fiber nonwoven fabric by means of a collection device. Examples of spinnerets for melt-blowing of mixed fibers include a spinneret for melt-blowing in which multiple holes for spinning one fiber ingredient and multiple holes for spinning the other fiber ingredient are alternatively arranged in line.

As for the laminated electret nonwoven fabric of the invention, the manufacturing method thereof is not limited if the laminated electret nonwoven fabric is subjected to electret processing in a structure in which at least one layer of nonwoven fabric B having the mean fiber diameter in the range of 10 micrometers to 100 micrometers is laminated on at least one side of nonwoven fabric A having the mean fiber diameter in the range of 0.1 micrometer to 15 micrometers.

When the melting point of fibers D constituting nonwoven fabric A is defined as d (° C.), and a melting point of fibers constituting at least a part of a surface of the fibers constituting nonwoven fabric B to be laminated with nonwoven fabric A is defined as b (° C.), a difference (b minus d) is preferably in the range of 20 to 200° C., further preferably, in the range of 30 to 200° C. When the difference (b minus d) is 20° C. or more, nonwoven fabric B keeps a fibrous form, and sufficient bonding properties can be maintained when nonwoven fabric B is laminated with nonwoven fabric A.

When nonwoven fabric A of the invention forms a fibrous layer obtained by the melt-blowing method, an inert gas such as air and a nitrogen gas is ordinarily used as a gas upon blown-spinning according to the melt-blowing method. Temperature of the gas is in the range of about 200 to about 500° C., preferably, in the range of about 250 to 450° C., pressure is in the range of about 0.1 to about 6.0 kgf/cm$^2$ (9.8 to 588 kPa), preferably, in the range of about 0.2 to about 5.5 kgf/cm$^2$ (19.6 to 539 kPa). Spinning conditions therefor are appropriately set up depending on physical properties and a combination of resins to be used, a targeted fiber diameter, a device such as a spinneret or the like.

Although the fiber diameter may be identical or different between fibers D and fibers E for nonwoven fabric A of the invention, nonwoven fabric A preferably includes mixed fibers having the mean fiber diameter in the range of 0.1 to 15 micrometers in combining fibers D and fibers E. The mean fiber diameter is further preferably in the range of 0.3 to 10 micrometers. If the mean fiber diameter is in the range of 0.1 micrometer or more, manufacturing is easy, productivity is satisfactory and a price also becomes low. If the mean fiber diameter is 15 micrometers or less, dust collection efficiency is sufficiently high.

The nonwoven's unit weight of nonwoven fabric A of the invention is not particularly limited, but is preferably in the range of 5 to 200 g/m$^2$, further preferably, in the range of 10 to 100 g/m$^2$ when the laminated nonwoven fabric is used for a filter material. When the laminated nonwoven fabric can be used for a mask material, the nonwoven's unit weight is not limited thereto, but is suitably in the range of 20 to 120 g/m² in view of a degree of gas permeability and dust collection performance required.

The fibers constituting nonwoven fabric A of the invention are needed to contain fibers D having a low melting point (preferably fibers having a low melting point including the elastomer) as a bonding ingredient in order to obtain the bonding properties, and fibers E in order to obtain permeability. From the above viewpoints, a preferred weight ratio of fibers D to fibers E is in the range of 20/80 to 80/20, further preferably, in the range of 30/70 to 70/30 in a ratio of weight of fibers D/weight of fibers E. If the weight ratio of fibers D in nonwoven fabric A is 20% by weight or more, the bonding force between a layer of nonwoven fabric A and a layer of nonwoven fabric B is sufficiently high, and thus peeling between the nonwoven fabrics does not occur during mask forming, pleating or the like. If the weight ratio of fibers D in nonwoven fabric A is 80% by weight or less, an amount of melted fibers D as the bonding ingredient of nonwoven fabric A is kept in a proper range, and therefore a pressure loss does not increase. The weight ratio of fibers D contained in nonwoven fabric A is preferably in the range of 5 to 50% by weight based on the weight of the laminated nonwoven fabric in view of a balance between strength and filtration performance of the laminated nonwoven fabric. The weight ratio is further preferably in the range of 10 to 30% by weight.

One of the thermoplastic resins (preferably an elastomer resin having a low melting point) constituting fibers D is not particularly limited as long as one of the thermoplastic resins meets the above conditions. Specific examples of the thermoplastic resins include polyolefin, polystyrene, polyester, polyamide and polyurethane, preferably, a polyolefin elastomer, a polystyrene elastomer, a polyester elastomer, a polyamide elastomer and a polyurethane elastomer. The polyolefin elastomer from which thin fibers are easily spun is particularly preferred, and any other ingredient may be copolymerized within the range in which polymer properties are not adversely affected.

Specific examples of the polyolefin elastomer include a random copolymer comprising an olefin monomer. The random copolymer of the polyolefin elastomer means a copolymer of a monomer being a hydrocarbon having a double bond and represented by $C_nH_{2n}$ (n is an integer of 2 or more, preferably, 10 or less, although an upper limit is not particularly limited), such as ethylene, propylene and butene, with at least one kind of monomers other than the above, in particular, a random copolymer in which the monomers are randomly arranged.

The random copolymer is preferably a copolymer of ethylene with an olefin having 3 to 10 carbons, or a copolymer of propylene with an olefin having 4 to 10 carbons, further preferably, a copolymer including ethylene and the olefin having 3 to 10 carbons. Specific examples include a copolymer of ethylene with propylene, 1-butene, 3-methyl-1-butene, 4-methyl-1-butene, 1-pentene, 1-hexene, 4-methyl-1-pentene, 1-heptene, 1-octene, 1-nonene and 1-decene. Among the olefins, 1-butene, 1-pentene, 1-hexene and 1-octene are particularly preferred. In particular, the above olefins can be used as one kind alone or in a combination of two or more kinds. An ethylene-olefin copolymer such as an ethylene-octene copolymer and an ethylene-butene copolymer in which the olefins are combined is preferred. A molecular weight distribution (Mw/Mn) of the copolymer of ethylene with the olefin having 3 to 10 carbons or propylene with the olefin having 4 to 10 carbons to be used for the invention is preferably in the range of 1.5 to 4 in view of spinnability. Specific examples of commercial products of such a polyolefin copolymer elastomer include "ENGAGE" (trade name, made by the Dow Chemical Company) and "Vistamaxx" (trade name, made by Exxon Mobil Corporation). A polyolefin copolymer used in the invention may be manufactured by using a metallocene catalyst. In addition, the polyolefin elastomer includes a terpolymer in which a crosslinking diene monomer is added to the olefin. Specific examples include an ethylene-propylene-diene rubber and an ethylene-butene-diene rubber.

As the polyolefin elastomer, elastomeric polypropylene or a propylene-ethylene block copolymer can be used suitably in addition thereto. Elastomeric polypropylene takes a form of stereobloc structure comprising crystalline isotactic or syndiotactic polypropylene, and amorphous atactic polypropylene in a polymer chain to be a structure in which propylene is copolymerized to form isotactic polypropylene or syndiotactic polypropylene as a hard segment, and atactic polypropylene as a soft segment. In the invention, elastomeric polypropylene disclosed in U.S. Pat. No. 4,335,225 B, U.S. Pat. No. 4,522,982 B and U.S. Pat. No. 5,188,768 B can be used, for example. Elastomeric polypropylene means both a homopolymer and a copolymer. The copolymer may contain, in addition to a propylene unit, any olefin unit other than the propylene unit, such as an ethylene, butylene, pentene or hexene unit in a molecule. Elastomeric polypropylene essentially has a stereoregular block arrangement in chain structure, and includes a block of sequences of selectively arranged isotactic polypropylene and atactic polypropylene in the polymer chain, for example.

The propylene-ethylene block copolymer means a real block copolymer in which a polypropylene segment and a poly(ethylene-co-propylene) segment are chemically bonded as shown in WO 00/23489 A (corresponding U.S. Pat. No. 6,815,508 B1), and polypropylene and poly(ethylene-co-propylene) do not exist in a blended state. Specifically, a predetermined amount of poly(ethylene-co-propylene) segment is synthesized using a polymerization reactor, preferably, a tubular polymerization reactor as exemplified in WO 99/26986 A in the presence of an olefin polymerization catalyst including a solid catalyst component containing titanium and halogen, or titanium, magnesium and halogen, and an organometallic compound such as triethylaluminum, and an electron donative compound added when necessary. Thus, the propylene-ethylene block copolymer in which the polypropylene segment and the poly(ethylene-co-propylene) segment are chemically bonded (covalently bonded) can be manufactured. The thus obtained propylene-ethylene block copolymer has a weight-average molecular weight (Mw) of 100,000 or more, a poly(ethylene-co-propylene) segment content in the range of 5 to less than 100% by weight, and a total ethylene content in the range of 2 to 95% by weight.

One of the thermoplastic resins constituting fibers E having a melting point higher than the melting point of fibers D is not particularly limited as long as one of the thermoplastic resins has a melting point higher than the melting point of one of the thermoplastic resins constituting fibers D, and is spinnable. For example, such resins can be used as polyolefins including polypropylene, high density polyethylene, low density polyethylene, linear low density polyethylene and a binary copolymer or a terpolymer of propylene with any other olefin, polyamides, polyesters including polyethylene terephthalate, polybutyrene terephthalate, polyester having a low melting point obtained by copolymerizing a diol with terephthalic acid or isophthalic acid and a polyester elastomer, a fluorocarbon resin, and a mixture of the above resins. Among the resins, a resin essentially based on the polyolefin is particularly preferred in view of demonstrating electret performance. Among the polyolefins, a polypropylene resin having an excellent heat resistance and easiness for spinning the thin fibers is further preferred. Moreover, any other ingredient may be copolymerized within the range in which the polymer properties are not adversely affected.

An antioxidant, a light stabilizer, an ultraviolet absorber, a neutralizer, a nucleating agent, an epoxy stabilizer, a lubricant, an antibacterial agent, a flame retardant, a pigment, a plasticizer, any other thermoplastic resin or the like can be added to the thermoplastic resins constituting fibers D and fibers E within the range in which the advantageous effects of the invention are not adversely affected. Moreover, a cycloolefin copolymer can be added for the purpose of improving heat resistance and the electret performance.

At least one kind selected from the group of hindered amine compounds preferably is added to the thermoplastic resins constituting fibers D and fibers E for the purpose of improving weather resistance and the electret performance.

Specific examples of the hindered amine compounds include poly[(6-(1,1,3,3-tetramethylbutyl)imino-1,3,5-triazine-2,4-diyl)((2,2,6,6-tetramethyl-4-piperidyl)imino)hexamethylene((2,2,6,6-tetramethyl-4-piperidyl)imino)] ("Chimassorb 944LD," made by Ciba-Geigy Ltd.), a dimethyl succinate-1-(2-hydroxyethyl)-4-hydroxy-2,2,6,6-tetramethylppiperidine copolymer ("Tinuvin 622LD," made by Chiba Specialty Chemicals Inc.), and 2-(3,5-di-t-butyl-4-hydroxybenzyl)-2-n-butylmalonic acid bis(1,2,2,6,6-pentamethyl-4-piperidyl) ("Tinuvin 144," made by Chiba Specialty Chemicals Inc.).

An added amount of the hindered amine compound to be compounded for the laminated electret nonwoven fabric of the invention is not particularly limited, but is preferably in the range of 0.5 to 5% by weight, further preferably, in the range of 0.6 to 3% by weight. If the added amount is 0.5% by weight or more, a targeted electret performance at a level of a high performance filter material is obtained easily. Moreover, if the added amount is 5% by weight or less, spinnability is favorable and the added amount is advantageous also in cost.

The laminated electret nonwoven fabric of the invention may be subjected to electret processing in the structure in which nonwoven fabric B having the mean fiber diameter in the range of 10 micrometers to 100 micrometers is laminated on at least one side of nonwoven fabric A having the mean fiber diameter in the range of 0.1 micrometer to 15 micrometers.

Herein, the electret processing means a processing method for providing the laminated nonwoven fabric with characteristics such as a dust collection function by charging the laminated nonwoven fabric electrically by performing electret treatment according to a thermal electret method for providing electric charges under a heated atmosphere at a temperature in which the ingredient of fibers having the low melting point does not melt, a corona discharge method for providing electric charges by corona discharge, or the like. However, an electret treatment method is not limited thereto.

Specific examples of lamination patterns of the laminated electret nonwoven fabric of the invention, namely, "the laminated nonwoven fabric in which at least one layer or a plurality of layers of nonwoven fabric B are laminated on at least one side of nonwoven fabric A" include a nonwoven fabric in which one layer or at least two layers of nonwoven fabric B are laminated on one side of nonwoven fabric A and a nonwoven fabric in which one layer or at least two layers of nonwoven fabric B are laminated on both sides of nonwoven fabric A (however, the number of lamination of nonwoven fabric B to be laminated on one side of nonwoven fabric A and the number of lamination of nonwoven fabric B to be laminated on the other side may be identical or different). Herein, when the total number of lamination of nonwoven fabric B to be laminated on nonwoven fabric A is plural, each nonwoven fabric B may be identical, or different from each other as long as nonwoven fabric B meets conditions of "nonwoven fabric including fibers having the mean fiber diameter in the range of 10 micrometers to 100 micrometers and being larger than the mean fiber diameter of fibers constituting nonwoven fabric A." Nonwoven fabric B being different from each other means that nonwoven fabric B may have any difference as long as an aim of the invention can be attained, such as the case where a mean fiber diameter of fibers constituting one of nonwoven fabric B and a mean fiber diameter of fibers constituting the other of nonwoven fabric B are different, the case where types (materials) of fibers constituting nonwoven fabric B are different, the case where one of fibers constituting nonwoven fabric B is composite fibers and the other of fibers is single fibers, the case where the nonwoven's unit weight, strength or gas permeability (pressure loss) is different between one of nonwoven fabric B and the other of nonwoven fabric B, the case where melting points of fibers constituting nonwoven fabric B are different, and the case where these cases are combined. Then, nonwoven fabric B can be appropriately selected according to the purpose and used.

Specific examples of the cases of using the air filter material as the mask material include (1) the case of a simple mask in which the mask material includes three-layer laminated filter material including pre-filter/main filter/pre-filter, and the main filter includes nonwoven fabric A, a spunbond nonwoven fabric including identical nonwoven fabric B or the like is used on both sides as the pre-filter to concurrently serve as a reinforcement for a less expensive mask. Specific examples include (2) the case of a high performance mask in which, in the case of pre-filter/main filter/reinforcement (a material having a satisfactory feeling is sometimes used as the reinforcement to avoid adversely affecting feeling on a skin side), or lamination of four or more layers including pre-filter/functional filter/main filter/reinforcement, the main filter includes nonwoven fabric A, and any other layer includes nonwoven fabric B, and nonwoven fabric B in each layer becomes different from each other because nonwoven fabric B having constitution suitable for demonstrating the performance is adopted. Specific examples include (3) the case of a cup-type dustproof mask in which the mask material includes pre-filter (filter performance and strength are needed to avoid damaging the main filter also when the mask is used at a dust generation site)/main filter/reinforcement (preferably being bulky in order to keep close contact with skin and moldability), and the main filter includes nonwoven fabric A and any other layer includes nonwoven fabric B, and nonwoven fabric B in each layer may be different because nonwoven fabric B having constitution suitable for demonstrating the performance is adopted.

When the laminated nonwoven fabric is used as the filter material, nonwoven fabric B including a large mean fiber diameter is preferably arranged particularly in an air inlet side because clogging of the filter material quickens if nonwoven fabric A including a low mean fiber diameter is arranged in an air inlet layer side. Moreover, at least two sheets of nonwoven fabrics B can be laminated on one side of nonwoven fabric A and thus used depending on suitability with performance required by the application.

As for nonwoven fabric B constituting the laminated electret nonwoven fabric of the invention, the manufacturing method thereof is not limited as long as the mean fiber diameter is in the range of 10 micrometers to 100 micrometers. A fibrous material constituting nonwoven fabric B also is not particularly limited if the fibrous material is one of the thermoplastic resins.

For example, when nonwoven fabric B is laminated on both sides of nonwoven fabric A and used as the filter material as one of the lamination patterns of the laminated electret nonwoven fabric of the invention, the filter material is preferably arranged by using nonwoven fabric B in the air inlet layer side as the pre-filter, and nonwoven fabric B laminated on an opposite side as the reinforcement.

As one of the thermoplastic resins for the fibers constituting nonwoven fabric B, such resins can be used as polyolefins including polypropylene, high density polyethylene, medium density polyethylene, low density polyethylene, linear low density polyethylene, and a binary copolymer or a terpolymer of propylene with any other olefin, polyamides, polyesters including polyethylene terephthalate, polybutylene terephthalate, polyester having a low melting point obtained by copolymerizing a diol with terephthalic acid or isophthalic acid and a polyester elastomer, a fluorocarbon resin, and a mixture of the above resins. A form of the fibers constituting nonwoven fabric B may be single ingredient fibers or composite fibers. A melting point of a resin constituting at least apart of a surface of the fibers is preferably higher than the melting point of fibers D.

The antioxidant, the light stabilizer, the ultraviolet absorber, the neutralizer, the nucleating agent, the epoxy stabilizer, the lubricant, the antibacterial agent, the flame retardant, the pigment, the plasticizer, any other thermoplastic resin or the like can be added to one of the thermoplastic resins constituting nonwoven fabric B within the range in which the advantageous effects of the invention are not adversely affected. Moreover, at least one kind selected from the group of the hindered amine compounds is preferably added thereto for the purpose of improving the weather resistance and the electret performance.

The nonwoven's unit weight of nonwoven fabric B constituting the laminated electret nonwoven fabric of the invention is not particularly limited, but is preferably in the range of 10 to 300 g/m$^2$, further preferably, in the range of 20 to 200 g/m$^2$, still further preferably, in the range of 40 to 100 g/m$^2$ when nonwoven fabric B is used as the reinforcement of the filter material. If the nonwoven's unit weight is 10 g/m$^2$ or more, an effect for reinforcing nonwoven fabric A is sufficient, and a favorable shape is kept during mask forming, pleating or the like. If the nonwoven's unit weight is 300 g/m$^2$ or less, productivity during mask forming or pleating is satisfactory.

The nonwoven's unit weight of nonwoven fabric B constituting the laminated electret nonwoven fabric of the invention is not particularly limited, but is preferably in the range of 5 to 200 g/m$^2$, further preferably, in the range of 10 to 100 g/m$^2$, still further preferably, in the range of 15 to 60 g/m$^2$ when nonwoven fabric B is used as the pre-filter. If the nonwoven's unit weight is 5 g/m$^2$ or more, strength of the nonwoven fabric is sufficiently high, and the favorable shape is kept during mask forming, pleating or the like. If the nonwoven's unit weight is 200 g/m$^2$ or less, flexibility of the nonwoven fabric is sufficiently high, and mask fitting properties are satisfactory when fitting the mask.

When nonwoven fabric A is used as the main filter and both of nonwoven fabric B to be used as the reinforcement and nonwoven fabric B to be used as the pre-filter are laminated thereon and thus used, nonwoven fabric B is preferably used within the range of the nonwoven's unit weight as described above with the nonwoven's unit weight of nonwoven fabric B to be used as the reinforcement of the filter material being larger than the nonwoven's unit weight of nonwoven fabric B to be used as the pre-filter.

Generally, the pre-filter is arranged on an inlet side of a gas to be a filtering treatment object, and the reinforcement is arranged on an outlet side of the gas to be the treatment object. With regard to the case of the mask or the like, the pre-filter is generally positioned on a side near outdoor air, and the reinforcement on a side near a human body, but the arrangement is not limited to thereto.

Nonwoven fabric B constituting the laminated electret nonwoven fabric of the invention preferably is obtained by a spunbond method. According to the spunbond method, productivity is very excellent, and the nonwoven fabric can be manufactured at a low cost because long fibers obtained by melt spinning can be directly opened, accumulated and processed into the nonwoven fabric. Moreover, the spunbond method is preferred because the method has a feature that the nonwoven fabric having excellent mechanical properties such as tensile strength can be obtained easily.

When nonwoven fabric B constituting the laminated electret nonwoven fabric of the invention is used as the reinforcement, nonwoven fabric B is preferably the spunbond nonwoven fabric comprising, as a main ingredient, polyester such as polyethylene terephthalate, polybutylene terephthalate and polytrimethylene terephthalate having a large difference in melting point from the melting point of fibers D having a low melting point and constituting nonwoven fabric A, and having favorable shape keeping properties during mask forming, pleating or the like.

When nonwoven fabric B constituting the laminated electret nonwoven fabric of the invention is used as the pre-filter in a form of the spunbond nonwoven fabric, fibers constituting the spunbond nonwoven fabric are preferably composite fibers having sheath-core structure including a sheath ingredient comprising a polyolefin having favorable bonding properties with fibers D constituting nonwoven fabric A, and a core ingredient comprising composite fibers including polyester having the large difference in melting point from the melting point of fibers D having the low melting point and constituting nonwoven fabric A, and having the favorable shape keeping properties during mask forming, pleating or the like in which the sheath ingredient comprises, as the main ingredient, a resin having a melting point lower than a melting point of the core ingredient.

Specific examples of combinations of the sheath ingredient and the core ingredient of such composite fibers include high density polyethylene/polyethylene terephthalate, low density polyethylene/polyethylene terephthalate, linear low density polyethylene/polyethylene terephthalate, ethylene-propylene copolymer/polyethylene terephthalate, polypropylene/polyethylene terephthalate, high density polyethylene/polybutylene terephthalate, low density polyethylene/polybutylene terephthalate, linear low density polyethylene/polybutylene terephthalate, ethylene-propylene copolymer/polybutylene terephthalate, polypropylene/polybutylene terephthalate, high density polyethylene/polytrimethylene terephthalate, low density polyethylene/polytrimethylene terephthalate, linear low density polyethylene/polytrimethylene terephthalate, ethylene-propylene copolymer/polytrimethylene terephthalate and polypropylene/polytrimethylene terephthalate. Preferred examples include high density polyethylene/polyethylene terephthalate and polypropylene/polyethylene terephthalate.

According to the spunbond method, for example, in the case of the composite fibers, a general-purpose composite spunbond spinning machine having two sets of extruders is used. Each resin is charged into each extruder, and a melted resin is discharged as long fibers through a composite spinneret kept at a high temperature. A group of discharged long fibers is introduced into an air sucker, drawn and stretched, subsequently allowed to be ejected from the air sucker, and collected on a conveyer. On the above occasion, such a method is applied as directly collecting the group of long fibers on a suction conveyer as a long fiber web, or opening fibers before collecting the group of long fibers on the conveyer, and then collecting the group of long fibers on the conveyer. Specific methods for opening fibers include a method for allowing the group of long fibers to pass between one pair of vibrating blade members (flaps) on the way to ejecting the group of long fibers, a method for allowing the group of long fibers to collide with reflectors, or a method for allowing the group of long fibers to be electrically charged according to a corona charge method. A collected long fiber web is conveyed with the suction conveyer, and subjected to chemical bonding or heat-treatment processing. Specific examples of the heat-treatment processing include point bonding processing. However, the heat-treatment processing is not limited thereto.

A method for laminating and uniting nonwoven fabric B with nonwoven fabric A is not particularly limited. However, in order to keep permeability, nonwoven fabric B preferably is united with nonwoven fabric A according to thermocompression bonding without using an adhesive such as latex.

When nonwoven fabric B is laminated with nonwoven fabric A according to the invention, nonwoven fabric B preferably is united with nonwoven fabric A by heating, pressing and bonding according to calendering in which thickness or permeability of the nonwoven fabric obtained can be adjusted. As for bonding temperature hereat, processing preferably is performed at a temperature in which only fibers D containing an elastomer ingredient having a relatively lower melting point melt and fibers E having a relatively higher melting point do not fully melt. Thus, only fibers D melt after lamination to demonstrate a bonding function, and fibers E keep the fibrous form, and therefore an air filter material having both an excellent bonding force and permeability using the laminated electret nonwoven fabric can be obtained, and thus such processing is preferred. On this occasion, the fibers constituting nonwoven fabric B are to be clearly processed at a temperature in which the fibers are not fully melted.

In calendering, a method for processing the nonwoven fabric at a desired permeability is preferred by using flat rollers and adjusting a clearance between one pair of heating flat rollers. As for the temperature of the heating flat rollers, the temperature of heating flat roll A in contact with nonwoven fabric A is preferably set at a level lower by 0° C. or more, further preferably, 10° C. or more than the melting point of fibers D (low melting point). The temperature of heating flat roll A is set at a level lower by 0° C. or more than the melting point of fibers D, and thus fibers D constituting nonwoven fabric A are not deformed in the whole nonwoven fabric, and therefore the pressure loss and the dust collection performance are favorably kept when the nonwoven fabric is used as the air filter. The temperature of heating flat roll B in contact with nonwoven fabric B is preferably set at a level higher by 0° C. to 70° C., further preferably, 10° C. to 40° C. than the melting point of fibers D (low melting point). The temperature of heating flat roll B is set at a level higher than the melting point of fibers D, and thus bonding of nonwoven fabric B with nonwoven fabric A is kept sufficiently strong, and peeling between the nonwoven fabrics does not occur during mask forming, pleating or the like. On the other hand, if the temperature of heating flat roll B is set at a temperature being not higher by 70° C. than the melting point of fibers D, fibers D constituting nonwoven fabric A are not deformed in the whole nonwoven fabric, and therefore the pressure loss and the dust collection performance are favorably kept when the nonwoven fabric is used as the air filter. When set temperature of heating flat roll B is higher by 10° C. to 40° C. than the melting point of fibers D, a part of fibers D of nonwoven fabric A in contact with nonwoven fabric B melts, and bonding with nonwoven fabric B is very favorable. However, the set temperature of the flat rolls needs to be lower than a melting point of any of fibers other than fibers D constituting the laminated nonwoven fabric of the invention. Moreover, as for conditions suitable for processing the nonwoven fabric to have the desired thickness and permeability, temperature, pressure, clearance, speed and so forth during treatment using the flat rolls can be appropriately selected and thus adjusted within the range in which action or the advantageous effects of the invention are not adversely affected.

According to the invention, fibers D contributing to thermal bonding remain in constituting a part of the whole in nonwoven fabric A. Therefore, even when one of calender rolls is changed to an embossing roll having an uneven shape, the pressure loss does not increase excessively when the laminated nonwoven fabric being the air filter material. When the laminated nonwoven fabric is produced using the heating flat roll and the embossing roll, the temperature of one of the heating flat rolls is preferably set at a level lower by 0° C. or more, further preferably, 10° C. or more than the melting point of fibers D (low melting point). The temperature of one of the heating flat rolls is set at a level lower by 0° C. or more than the melting point of fibers D, and thus fibers D constituting nonwoven fabric A are not deformed in the whole nonwoven fabric, and therefore the pressure loss and the dust collection performance are favorably kept when the nonwoven fabric is used as the air filter. The temperature of a heating embossing roll is preferably in the range of −20° C. to +50° C., further preferably, in the range of −10° C. to +30° C., relative to the melting point of fibers D. However, when nonwoven fabric A is exposed on one side, a heating flat roll preferably is applied as a roll in contact with nonwoven fabric A. Accordingly, the heating embossing roll is contacted with nonwoven fabric B and thus used. When nonwoven fabric B is laminated on both sides of nonwoven fabric A, the heating flat roll is contacted with one of nonwoven fabric B and the embossing roll is contacted with the other of nonwoven fabric B.

An area of a bonding part by means of the embossing roll is preferably in the range of 0.5 to 20%, further preferably, in the range of 1 to 8% of the laminated nonwoven fabric. If the area is 0.5% or more, the strength of the nonwoven fabric is sufficient and shape keeping during mask forming, pleating or the like is favorable. If the area is 20% or less, the pressure loss is sufficiently suppressed and performance of the air filter particularly as a mask is maintained. Temperature, pressure, clearance and speed during treatment using the embossing rolls can be selected appropriately within the range in which the action or the advantageous effects of the invention are not adversely affected.

When a layer of nonwoven fabric B is partially bonded with a layer of nonwoven fabric A and also layers of nonwoven fabric B are partially bonded with each other (when at least two layers of nonwoven fabric B are laminated on at least one side) according to the invention by ultrasonic bonding or high-frequency bonding, an area of a bonding part is preferably in the range of 0.5 to 20%, further preferably, in the range of 1 to 8% of the laminated nonwoven fabric in order to suppress the pressure loss. If the area is 0.5% or more, the strength of the nonwoven fabric is sufficient and shape keeping during mask forming, pleating or the like is favorable. If the area is 20% or less, the pressure loss is sufficiently suppressed and the performance of the air filter particularly as the mask is maintained.

The laminated electret nonwoven fabric of the invention can be used suitably for a medical mask, an industrial mask, a general purpose mask or the like. Moreover, the nonwoven fabric can be processed into a high performance air filter to a High Efficiency Particulate Air Filter (HEPA) to be used for an air conditioner or an air conditioning system depending on conformance with performance required. The laminated electret nonwoven fabric of the invention preferably may be pleated and thus used for the above application. In addition, when the laminated electret nonwoven fabric of the invention is processed, a melting point of various kinds of fibers constituting the processed product can be confirmed by means of Differential Scanning calorimetry (DSC).

EXAMPLES

In the following, the invention will be explained by means of Examples and Comparative Examples, but the invention is in no way limited thereto. In addition, methods for measuring values of physical properties shown in Examples and Comparative Examples or definitions thereof are shown below.

Physical properties of fibers are shown.
Melting point: A melting point (° C.) was measured in accordance with JIS $K_{7121}$-1987.
Physical properties of a nonwoven fabric are shown.
Mean fiber diameter: A small piece was cut out from a nonwoven fabric, a photograph having a 1,000 to 5,000 times magnification was taken by means of a scanning microscope, a diameter was measured for a total of 100 fibers, and then a mean fiber diameter (μm) was calculated from a mean value.

Nonwoven's unit weight: A whole of a formed body obtained by cutting a nonwoven fabric into 25 cm×25 cm was weighed, and nonwoven's unit weight was shown as weight per unit area (g/m²).
Permeability: Permeability (cm/sec) was measured in accordance with JIS L1084-2009 and JIS L1018-1999.

A test for filter characteristics was shown.

Dust collection efficiency (%): A value (%) obtained by measuring an amount of dust collected in a nonwoven fabric by means of a particle measuring instrument (Particle Counter KC-01, made by Rion Co., Ltd.) when allowing 28.3 L (corresponding to 1 Ft³) of air dust (particle diameter: 0.3 to 5 μm, the number of particles: 1,500 to 7,000 particles/L) to pass through a sample at a speed of 5 cm/sec, and calculating the amount in percentage based on a total amount of dust to be passed.

Pressure loss (Pa): A differential pressure (Pa) between an atmospheric pressure and a pressure when allowing 28.3 L (corresponding to 1 Ft³) of air dust (particle diameter: 0.3 to 5 μm, the number of particles: 1,500 to 7,000 particles/L) to pass through a sample at a speed of 5 cm/sec was read from a gauge.

TABLE 1

| | Nonwoven fabric A | | | | Nonwoven fabric B | Nonwoven fabric B | |
|---|---|---|---|---|---|---|---|
| | Fiber | | Mean fiber diameter | Nonwoven's unit weight | | | |
| | D | E | μm | g/m² | (B1) | (B2) | Lamination |
| Example 1 | ENGAGE | PP | 2.5 | 30 | PET-SB | PE/PET-SB | Flat roll |
| Example 2 | ENGAGE | PP | 2.4 | 60 | PET-SB | | Embossing roll |
| Example 3 | Vistamaxx | PP | 1.6 | 30 | PET-SB | | Embossing roll |
| Example 4 | Vistamaxx | PP | 1.4 | 60 | PET-SB | PE/PET-SB | Flat roll |
| Comparative Example 1 | PP | PP | 2.6 | 30 | PET-SB | PE/PET-SB | Flat roll |
| Comparative Example 2 | PP | PP | 2.5 | 60 | PET-SB | PE/PET-SB | Embossing roll |
| Comparative Example 3 | PP | PP | 2.8 | 30 | PET-SB | | Embossing roll |

Note)
ENGAGE (trade name, made by The Dow Chemical Company): ethylene-octene random copolymerization, melting point: 100° C.
Vistamaxx (trade name, made by Exxon Mobil Corporation): polypropylene-ethylene random copolymerization, melting point: 40° C.
PP: crystalline homopolypropylene, melting point: 160° C.
PET-SB: PET regular spunbond nonwoven fabric, nonwoven's unit weight: 60 g/m², melting point: 240° C., mean fiber diameter: 40 μm
PE/PET-SB: sheath-core composite spunbond nonwoven fabric of HDPE/PET: 50/50 (wt. %) (sheath ingredient is HDPE), nonwoven's unit weight: 17 g/m², melting point of sheath ingredient: 125° C., melting point of core ingredient 240° C., mean fiber diameter: 17 μm.
In addition, PET represents polyethylene terephthalate, and HDPE represents high density polyethylene in the above.

Example 1

A polyethylene elastomer and polypropylene were used as a D ingredient and an E ingredient of nonwoven fabric A, respectively, as a raw material. A melt-blown nonwoven fabric was manufactured by using a nonwoven fabric manufacturing apparatus including two sets of extruders each having a screw (50 mm in diameter), a heating member and a gear pump, a spinneret for mixed fibers (0.3 mm in hole diameter, 501 holes in number of holes in line, alternatively aligned in line for fibers containing different ingredients, 500 mm in effective width), a compressed air generator, an air heater, a collection conveyor equipped with a net made of polyester, and a winder.

Each raw material resin was charged into each extruder to allow the polyethylene elastomer and polypropylene to be heated and melted at 230° C. and 230° C., respectively, and allow a melted resin to be discharged from the spinneret at a spinning rate of 0.3 g/min per single hole by setting the gear pump to be 50/50 in a weight ratio of the polyethylene elastomer/polypropylene. Discharged fibers were blown onto nonwoven fabric B (spunbond nonwoven fabric having a nonwoven's unit weight of 60 g/m$^2$) on the conveyor made of polyester set at a distance of 30 centimeters from the spinneret by means of compressed air heated at 400° C. and having a pressure of 98 kPa (gauge pressure), a speed of the collection conveyer was adjusted, and thus a laminated sheet including nonwoven fabric A having a nonwoven's unit weight of 30 g/m$^2$ and nonwoven fabric B (defined as B1) was obtained.

Next, in order to laminate another nonwoven fabric B (defined as B2) on a side of nonwoven fabric A of the laminated sheet including nonwoven fabric B/nonwoven fabric A, calendering was performed by allowing the laminated sheet including nonwoven fabric B (B1)/nonwoven fabric A and also another nonwoven fabric B (B2) to pass between one pair of flat rolls heated at 110/110° C., and having a pressure of 3.4 MPa, and thus a laminated nonwoven fabric including nonwoven fabric B (B1)/nonwoven fabric A/nonwoven fabric B (B2) was obtained. A laminated electret nonwoven fabric was prepared by applying a voltage of −10 kV to the laminated nonwoven fabric obtained for 5 seconds after keeping the nonwoven fabric for 5 minutes under an atmosphere of 100° C.

Example 2

A laminated sheet including nonwoven fabric A having a nonwoven's unit weight of 60 g/m$^2$ and nonwoven fabric B (B1) was obtained by adjusting a speed of the collection conveyer in a manner similar to Example 1. Next, embossing was performed by allowing the laminated sheet including nonwoven fabric B (B1)/nonwoven fabric A to pass between an embossing roll having an area ratio of 5.6% in an embossing projection and a flat roll in which the embossing roll to be contacted with the nonwoven fabric B (B1) was heated at a temperature of 90° C., and the flat roll to be contacted with the nonwoven fabric A was heated at a temperature of 60° C., and pressure was 1.0 MPa, and thus a laminated nonwoven fabric was obtained. A laminated electret nonwoven fabric was prepared by applying a voltage of −10 kV to the nonwoven fabric obtained for 5 seconds after keeping the nonwoven fabric under an atmosphere of 100° C. for 5 minutes.

Example 3

A laminated sheet including nonwoven fabric A having a nonwoven's unit weight of 30 g/m$^2$ and nonwoven fabric B (B1) was obtained in a manner similar to Example 1 except that a polypropylene elastomer was used as a raw material for a D ingredient in manufacturing the laminated sheet including nonwoven fabric A and nonwoven fabric B (B1).

Next, embossing was performed by allowing the laminated sheet including nonwoven fabric B (B1)/nonwoven fabric A to pass between an embossing roll having an area ratio of 5.6% in an embossing projection and a flat roll in which the embossing roll to be contacted with the nonwoven fabric B (B1) was heated at a temperature of 70° C., and the flat roll to be contacted with the nonwoven fabric A was heated at temperature of 40° C., and the pressure was 1.0 MPa, and thus a laminated nonwoven fabric was obtained. A laminated electret nonwoven fabric was prepared by applying a voltage of −10 kV to the nonwoven fabric obtained for 5 seconds after keeping the nonwoven fabric under an atmosphere of 100° C. for 5 minutes.

Example 4

A laminated sheet including nonwoven fabric A having a nonwoven's unit weight of 60 g/m$^2$ and nonwoven fabric B (defined as B1) was obtained by adjusting a speed of the collection conveyer in a manner similar to Example 3. Next, in order to further laminate another nonwoven fabric B (defined as B2) on a side of nonwoven fabric A of the laminated sheet including nonwoven fabric B (B1)/nonwoven fabric A, calendering was performed by allowing the laminated sheet including nonwoven fabric B (B1)/nonwoven fabric A and nonwoven fabric B (B2) to pass between one pair of flat rolls heated at 80° C./80° C., and having a pressure of 3.4 MPa, and thus a laminated nonwoven fabric including nonwoven fabric B (B1)/nonwoven fabric A/nonwoven fabric B (B2) was obtained. A laminated electret nonwoven fabric was prepared by applying a voltage of −10 kV to the nonwoven fabric obtained for 5 seconds after keeping the nonwoven fabric under an atmosphere of 100° C. for 5 minutes.

Comparative Example 1

A laminated sheet including nonwoven fabric A having a nonwoven's unit weight of 30 g/m$^2$ and nonwoven fabric B (B1) was obtained in a manner similar to Example 1 except that polypropylene was used as a raw material for fibers D in manufacturing the laminated sheet including nonwoven fabric A and nonwoven fabric B (B1).

Next, in order to further laminate another nonwoven fabric B (defined as B2) on a side of nonwoven fabric A of the laminated sheet including nonwoven fabric B (B1)/nonwoven fabric A, calendering was performed by allowing the laminated sheet including nonwoven fabric B (B1)/nonwoven fabric A and another nonwoven fabric B (B2) to pass between one pair of flat rolls in which one of the flat rolls to be contacted with the nonwoven fabric B (B1) was heated at a temperature of 160° C., the other of the flat rolls to be contacted with the nonwoven fabric B (B2) was heated at a temperature of 110° C., and pressure was 3.4 MPa, and thus a laminated nonwoven fabric including nonwoven fabric B (B1)/nonwoven fabric A/nonwoven fabric B (B2) was obtained. A laminated electret nonwoven fabric was prepared by applying a voltage of −10 kV to the nonwoven fabric obtained for 5 seconds after keeping the nonwoven fabric under an atmosphere of 100° C. for 5 minutes.

Comparative Example 2

A laminated sheet including nonwoven fabric A having a nonwoven's unit weight of 60 g/m$^2$ and nonwoven fabric B (B1) was obtained by adjusting a speed of the collection conveyer in a manner similar to Comparative Example 1. Next, in order to further laminate another nonwoven fabric B (B2) on a side of nonwoven fabric A of the laminated sheet including nonwoven fabric B (B1)/nonwoven fabric A, embossing was performed by allowing the laminated sheet including nonwoven fabric B (B1)/nonwoven fabric A and nonwoven fabric B (B2) to pass between an embossing roll having an area ratio of 5.6% in an embossing projection and a flat roll in which the embossing roll to be contacted with the nonwoven fabric B (B1) was heated at a temperature of 140° C., and the flat roll to be contacted with the nonwoven fabric B (B2) was heated at a temperature of 110° C., and pressure was 1.0 MPa, and thus a laminated nonwoven fabric was obtained. A laminated electret nonwoven fabric was prepared by applying a voltage of −10 kV to the nonwoven fabric obtained for 5 seconds after keeping the nonwoven fabric for 5 minutes under an atmosphere at 100° C.

Comparative Example 3

Embossing was performed by allowing the laminated sheet including nonwoven fabric B (B1)/nonwoven fabric A obtained according to Comparative Example 1 to pass between an embossing roll having an area ratio of 5.6% in an embossing projection and a flat roll in which the embossing roll to be contacted with the nonwoven fabric B (B1) was heated at a temperature of 140° C., and the flat roll to be contacted with the nonwoven fabric A was heated at a temperature of 120° C., and pressure was 1.0 MPa, and thus a laminated nonwoven fabric was obtained. A laminated electret nonwoven fabric was prepared by applying a voltage of −10 kV to the nonwoven fabric obtained for 5 seconds after keeping the nonwoven fabric under an atmosphere of 100° C. for 5 minutes.

Collection efficiency and a pressure loss as filter characteristics, and processability were measured for products obtained from Examples 1 to 4 and Comparative Examples 1 to 3. The results were shown in Table 2.

TABLE 2

|  | Collection efficiency % | Pressure loss Pa | Processability |
|---|---|---|---|
| Example 1 | 90.8 | 25.0 | Good |
| Example 2 | 99.1 | 84.5 | Good |
| Example 3 | 90.2 | 22.0 | Good |
| Example 4 | 98.9 | 73.0 | Good |
| Comparative Example 1 | 91.1 | 41.5 | Bad |
| Comparative Example 2 | 97.1 | 142.0 | Good |
| Comparative Example 3 | 90.8 | 42.0 | Good |

Note)
Processability: Judged under processing conditions where processing speed is 1 m/min, processing temperature is 40° C., and pleats include 1 cm/crest.
Good: A fused part is not peeled, and processability is satisfactory.
Bad: A fused part is peeled, and processability is unsatisfactory.

As can be seen from Table 2, the laminated electret nonwoven fabric of the invention is found to have an excellent processability, and a high dust collection efficiency with a low pressure loss. According to the invention, the pressure loss can be confirmed to be significantly decreased by comparing the test results using the laminated electret nonwoven fabric having an identical nonwoven's unit weight between Examples and Comparative Examples. Moreover, fibers D having a relatively lower melting point are mixed into nonwoven fabric A, and thus nonwoven fabric A can be confirmed to be laminated with nonwoven fabric B at a low temperature. Thus, the laminated electret nonwoven fabric can be obtained in which a resin bond or a bonding component such as latex in a lamination interface is not needed and the pressure loss is suppressed. Furthermore, electret processing is applied after lamination, and thus dust collection performance can be improved without decaying a charging effect. According to the laminated electret nonwoven fabric of the invention, the dust collection performance from a high performance class to a HEPA class can be obtained while keeping the low pressure loss.

INDUSTRIAL APPLICABILITY

A laminated electret nonwoven fabric of the invention can have a suppressed pressure loss while having a high collection performance of a high performance class or a HEPA class, and therefore can be suitably used for a medical mask, an industrial mask, a general purpose mask or the like. Moreover, the laminated electret nonwoven fabric of the invention can be used for a filter material for an air conditioner, an air conditioning system or the like depending on conformance with performance required.

What is claimed is:
1. An air filter material, comprising:
a laminated electret nonwoven fabric subjected to electret processing used for a laminated nonwoven fabric, the laminated electret nonwoven fabric comprising:
a nonwoven fabric A including mixed fibers containing fibers D and fibers E, the fibers D and the fibers E having a mean fiber diameter in the range of 0.1 micrometer to 15 micrometers and having a different melting point, the fibers D having a lower melting point, the fibers E having a higher melting point; and
one layer or a plurality of layers of nonwoven fabric B laminated on at least one side of the nonwoven fabric A, the nonwoven fabric B including fibers having a mean fiber diameter in the range of 10 micrometers to 100 micrometers and being larger than a mean fiber diameter of the fibers constituting the nonwoven fabric A,
wherein a difference (b minus d) is 20° C. or more when the melting point of the fibers D constituting the nonwoven fabric A is defined as d (° C.), a melting point of a fiber structure component having a lowest melting point among fiber structure components that constitute at least a part of a surface of the fibers constituting the nonwoven fabric B is defined as b (° C.).

2. The air filter material according to claim 1, wherein the fibers D constituting nonwoven fabric A contain an elastomer, and a difference (e minus d) is in the range of 20 to 150° C. when a melting point of the fibers D is defined as d (° C.) and a melting point of the fibers E is defined as e (° C.).

3. The air filter material according to claim 1, wherein a weight ratio of the fibers D to the fibers E both constituting nonwoven fabric A, "weight of fibers D/weight of fibers E," is in the range of 20/80 to 80/20.

4. The air filter material according to claim 1, wherein the fibers D comprise a polyolefin elastomer.

5. The air filter material according to claim 1, wherein a hindered amine compound is added to a resin ingredient constituting the fibers D and the fibers E.

6. The air filter material according to claim 1, wherein nonwoven fabric A is a melt-blown nonwoven fabric and at least one layer of nonwoven fabric B to be laminated on nonwoven fabric A is a spunbond nonwoven fabric.

7. The air filter material according to claim 1, wherein the air filter material is an air filter material in which at least one layer of the nonwoven fabric B is laminated on both sides of the nonwoven fabric A, respectively, the nonwoven fabric A is a melt-blown nonwoven fabric, and at least one layer of the nonwoven fabric B laminated on each side of the nonwoven fabric A among the nonwoven fabric B laminated on both sides of the nonwoven fabric A is a spunbond nonwoven fabric.

8. The air filter material according to claim 6, wherein fibers constituting the spunbond nonwoven fabric of the nonwoven fabric B comprise polyester.

9. The air filter material according to claim 6, wherein at least one of the nonwoven fabric B including the spunbond nonwoven fabric includes composite fibers having a sheath-core structure for fibers constituting the spunbond nonwoven fabric, and a core ingredient comprises polyester, and a sheath ingredient comprises a resin having a melting point lower than a melting point of the core ingredient.

* * * * *